United States Patent [19]

Dubreucq

[11] 4,305,485

[45] Dec. 15, 1981

[54] SYSTEM FOR ASSEMBLING AND FIXING A COIL FOR EDDY CURRENT BRAKING TO A RAILWAY VEHICLE

[75] Inventor: Yvon Dubreucq, Lesquin, France

[73] Assignee: Agence Nationale de Valorisation de la Recherche, France

[21] Appl. No.: 102,520

[22] Filed: Dec. 11, 1979

[30] Foreign Application Priority Data

Dec. 15, 1978 [FR] France .................. 78 35471

[51] Int. Cl.³ .............................. B60L 7/28
[52] U.S. Cl. ........................ 188/164; 310/64
[58] Field of Search .............. 188/158, 159, 164, 165, 188/267; 310/64, 65, 103, 105, 106

[56] References Cited

U.S. PATENT DOCUMENTS

| 3,881,578 | 5/1975 | Dubreucq | 188/165 |
| 3,899,061 | 8/1975 | Krug | 188/164 |
| 4,144,954 | 3/1979 | Farello et al. | 188/165 |

FOREIGN PATENT DOCUMENTS

| 457672 | 3/1928 | Fed. Rep. of Germany . |
| 2177866 | 11/1973 | France . |
| 2278552 | 2/1976 | France . |
| 633125 | 12/1949 | United Kingdom . |

*Primary Examiner*—Edward R. Kazenske
*Attorney, Agent, or Firm*—Karl W. Flocks; A. Fred Starobin

[57] ABSTRACT

A coil for a dynamic eddy current braking system affixed to the lower half of a vehicle wheel by two steel, yoke-shaped, end supports joined by parallel rectilinear arms, with the end supports spaced for clearance from the coil and along with thin non-magnetic sheets defining free enclosures around the coil ends, the supports having holes to inject an elastomer into the free enclosures. Seals limit the elastomer to the flat portions of the coils and plates in the zone of injection of the elastomer are immobilized in relation to the support parallel to rectilinear arms but separable from the inner wall of the support to permit thermal expansion and contraction of the coil and elastomer in the support without loss of the transmission of forces to the support occurring in the course of braking and without exaggerated transfer of forces to the support in the case of considerable heating or cooling and without detachment of the elastomer in the case of a very considerable drop in ambient temperature.

9 Claims, 4 Drawing Figures

SYSTEM FOR ASSEMBLING AND FIXING A COIL FOR EDDY CURRENT BRAKING TO A RAILWAY VEHICLE

BACKGROUND OF THE INVENTION

1. Field of the Invention

The present invention relates to a system for assembling and fixing a coil for eddy current braking to a railway vehicle.

2. Description of the Prior Art

The inventor has described in his co-pending U.S. patent application Ser. No. 413,338, now U.S. Pat. No. 3,881,578, a process and a device for eddy current braking for vehicles or engines moving on magnetic metal rails where the wheels are also of magnetic metal.

Without entering into unnecessary details under the circumstances, it will be recalled succinctly that the braking device according to this patent includes essentially energizing windings mounted preferably around the lower half of the wheels of at least one pair of wheels coaxial with the axle of magnetic metal, a supply system for DC electric current to said windings enabling the generation, at an opportune moment, of a magnetic flux generating eddy currents which are efficient retarders in the wheels and the rails.

One of the major problems to be resolved in such an eddy current dynamic braking system is to be able to transmit the braking effects to the chassis or to the bogie.

One of the solutions proposed in the aforementioned prior patents of the inventor consists of constituting each coil by a winding of concentric turns of conducting metal, preferably strips of oxidized aluminum so as to form, by gluing together, a rigid ring whose rigidity is due to the conducting metal itself. This rigid ring is then made fast to the chassis or the armature of the bogie by fixed fasteners, on the one hand, only at each of the ends of the winding, on the other hand, to the chassis or to the armature. More especially, the fasteners fixed to the ends of the winding are constituted by an upper part and by a lower part forming a sandwich of said winding, with the interposition of a thickness of elastic material, said upper and lower support parts being coupled together by fastening bolts.

If this solution is found to be perfectly suitable for use under conditions of use for which the heating would not be too great, it does not perfectly resolve the problem of longitudinal expansion of the coil for considerable heating for example of the order of 200° C., without transmitting exaggerated forces to the assembly. Neither does this solution solve the problem of the thermal restraint of an aluminum coil held in a sandwich in steel supports.

It would have been possible to imagine the conventional solution consisting of interposing, between the support parts and the chassis or the bogie, known elastic means such as flexible mountings or the like.

This solution, in addition to its complexity, would besides resolve neither the delicate problem of the low frequencies characteristic of the assembly by reason notably of the further increased suspended mass, nor the problem of the contraction of the aluminum coil at low temperature with respect to that of the steel supports.

The solution proposed in the prior art patents have, in addition, other drawbacks which are less important among which may be mentioned:

the accumulation against the coil of mud or of water thrown by the wheel between the supports causing, by reason of the closeness of the metallic masses, insulation faults;

the presence of bolts and nuts which pose problems of safety;

the low mechanical stiffness of the assembly making risky the assembly in cantilever manner which is found to be however almost essential by reason of the design of the bogies themselves;

the double thermal barrier between the aluminum coil and the steel supports which makes worse cooling through the supports.

It is an object of the present invention to provide a system of assembly and fixing on a bogie or a chassis, a winding for dynamic braking by eddy currents, which completely eliminates the above-mentioned drawbacks of prior art systems.

It is another object to provide such a system which has complete fluid-tightness of the fastening between the winding and the supports ensuring good electrical insulation;

one-piece support parts, without nuts and bolts considerably increasing the safety whilst reducing the cost price;

great stiffness of these one-piece support parts enabling the mounting of the assembly on the chassis or the bogie as a cantilever system; and a very distinctly improved cooling of the whole of the winding through a perfect thermal coil-support contact due to the increase of the surfaces and the reduction of thicknesses and the insulating homogeneity.

GENERAL DESCRIPTION OF THE INVENTION

The winding for the eddy current dynamic braking system according to the invention is characterized essentially by a combination of specially adapted means, namely:

a winding of electrically conducting material of which the turns are isolated and rendered fast to one another so as to constitute a one-piece torus of rectangular cross section, equivalent to a beam of the same solid electrical conductor material of the same cross-section, known in itself;

two steel supports, of which at least one has a U-shaped section inverted to the horizontal, which come to envelop the curvilinear ends and a portion of the rectilinear arms of the coil;

two thin sheets of non-magnetic material coming to obscure respectively the open part of each of the U supports, when they are in place around the coil;

an injectable composition capable of giving an elastomeric product after cross-linking at a suitable temperature;

fluid-tight seals with which the coil is provided prior to its introduction into the supports, which have the effect of defining the injection zones of the aforesaid composition to the flat parts of the coil comprised inside each of the supports;

thin steel sheets preferably perforated with holes in quincunx which are welded through at least one of their ends to the inner wall of the supports, to enable thermal shrinkages of the coil/elastomer assembly in the supports without modifying the possibility of transmission of longitudinal forces generated in the course of braking and without detachments of the elastomeric product with respect to the support.

Other characteristics, advantages and particularities of the present invention will emerge from the description which is given below with reference to the accompanying diagrammatic drawings showing, by way of explanation and without being limiting, one possible embodiment of said invention.

DESCRIPTION OF PREFERRED EMBODIMENTS

Figure 1:
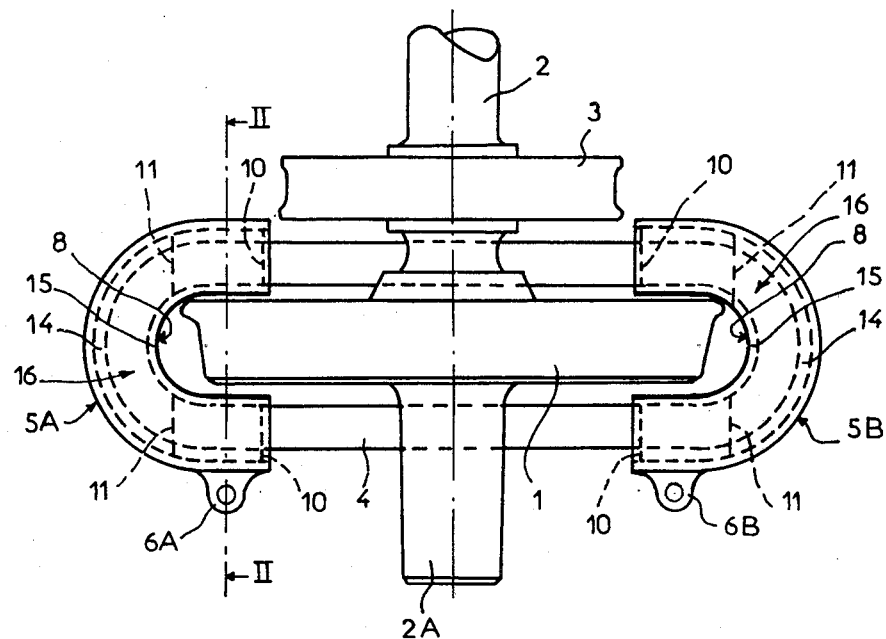
FIG. 1 is a view from above of a winding in accordance with the invention in position around the wheel of a railway vehicle, the bogie not being shown for clarity of the drawing.

By way of example, there is shown in FIG. 1, the end of an axle equipped with an eddy current dynamic braking winding according to the invention and with a disc brake. This Figure, on which the bogie of the vehicle as well as the bearings of the axle have not been shown for clarity in the drawings, has the essential purpose of showing the general design and the basic principle of a winding according to the invention as well as its positioning with respect to the wheel.

More particularly, the half-axle comprises a one-piece wheel of steel 1, sintered on the body of the axle 2, whose journal 2 pivots in a bearing (not shown) and lightened disc brake 3, of any known type, bound to the axle 2, the brake clamp not being shown.

Figure 2:
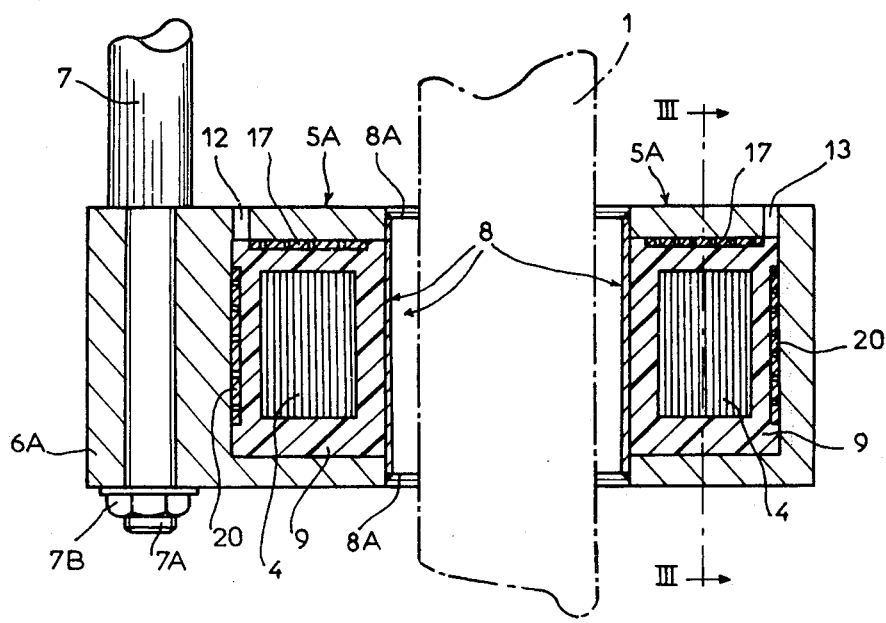
FIG. 2 is a detailed view showing, on a larger scale, a cross-section of the winding, made along the line II—II of FIG. 1.

The energizing winding according to the invention, which is mounted around the lower half of the wheel 1, is essentially constituted by a coil 4 of generally oval shape with rectangular cross-section, whose two ends are housed, enveloped and held in generally yoke-shaped supports $5_A$, $5_B$ provided laterally and at their outer end with lugs $6_A$, $6_B$ enabling fastening of the thus-constituted one-piece unit in overhanging relationship by means of stays or support posts, such as the stay 7 shown in FIG. 2, whose threaded end $7_A$ is held in the orifice of the lug $6_A$ by a nut $7_B$.

More particularly, the coil 4 is constituted, in manner known in itself, by a winding of concentric turns of oxidized aluminum strip, said turns being glued together by the interposition, at the moment of winding, of a glue on their opposite surfaces so that, after drying and/or baking the glue, said winding constitutes a rigid ring whose principal rigidity is due to the metal conducter itself. In other words, the coil of aluminum foil thus produced constitutes, and this is what is important, a one-piece torus equivalent to an aluminum member of the same cross-section.

Of course, the present invention would be applied in the same way if the coil were formed by means of any electrically conducting material whose turns were insulated and rendered fast to one another in any manner known in itself, such as, for example, of enameled, impregnated copper wires.

As for the end supports $5_A$ and $5_B$, they are constituted of steel and have a cross-section in the form of an inverted U on the horizontal, or of a gutter, as will appear clearly from FIG. 2.

In addition, and according to an important feature of the invention, to which reference will be made in detail below, the open inner portion of the support, when the coil 4 has been placed in position inside said support in the manner which will be described below, is obturated by means of a thin sheet of non-magnetic material, such as stainless steel 8.

Besides its protective role against the various water and mud thrown up by the wheel, against possible faults of insulation due to the proximity of the metallic masses, this sheet has the purpose, in closing the gutter of the supports $5_A$, $5_B$, of constituting enclosures capable of holding in place the ends of the coil 4 by means of an injectable composition giving an elastomer, after cross-linking at suitable temperature. The elastomer product 9 thus obtained completely fills the space comprised between the inner wall of said enclosure and the outer wall of the coil 4, as will be seen distinctly in FIG. 2. The coil 4 is thus held fast inside the end supports.

According to another important feature of the invention which has the purpose of permitting longitudinal expansion of the coil 4 for considerable heating, for example of the order of 200° C., without transmitting exaggerated forces to the assembly, there are provided on the coil 4 transversal fluid-tight seals such as 10 and 11 which define the injection zones at the flat rectilinear portions of the coil comprised inside the supports $5_A$ and $5_B$. The injection of the composition inside the support is effected through suitable orifices such as 12 and 13 which can be seen in FIG. 2. As will also be apparent on reading the latter Figure, it is seen that the connection between the supports and the coil is obtained by means of two blocks of elastomeric product 9 for each support, limited in length to the flat rectilinear portions of the coil.

Figure 3A:
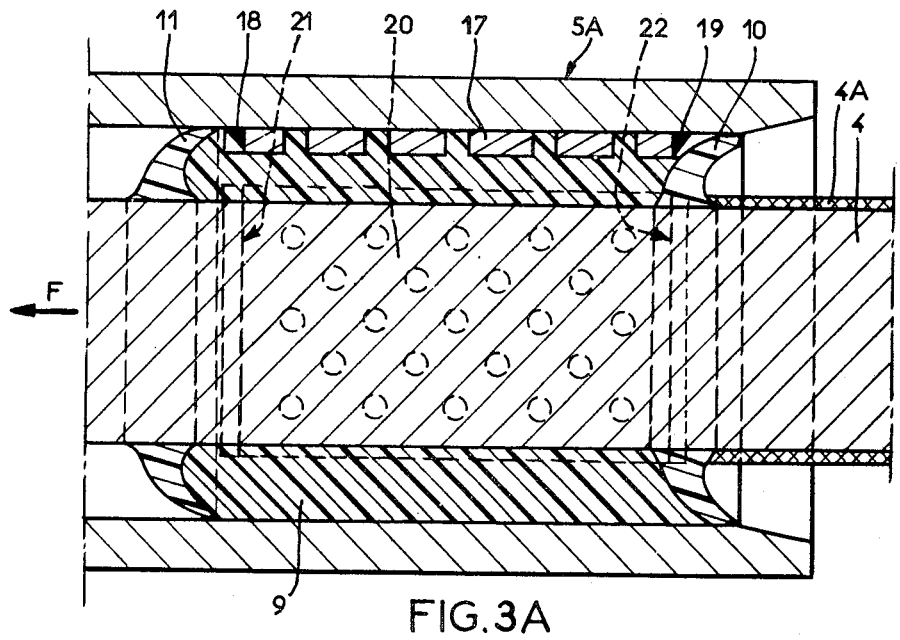
FIG. 3A is a detailed view showing, on a larger scale, a partial longitudinal cross-section of the winding, made along the line III—III of FIG. 2, this Figure showing the manner in which is mounted according to the invention, the coil proper inside the end support.

It is apparent on reading FIGS. 1 and 3A that if a longitudinal expansion of the coil 4 occurs, under the effect of considerable heating, said coil can elongate in the direction of the arrow F, without there being transmission of exaggerated forces to the support $5_A$ which, itself, can remain immobile with respect to the bogie, this due to the deformation of the elastomeric product 9 inside of the space bounded in length by the fluid-tight seals 10 and 11 which are also elastic.

The condition sine qua non is that there should not be elastomeric product in the free spaces comprised between the vertical curvilinear walls such as the spaces 14 and 15 of FIG. 1, since this product is incompressable. On the other hand, it is quite obvious that it is possible if necessary to provide the presence of the composition giving rise to an elastomeric product in the upper and lower spaces comprised between the support $5_A$, $5_B$ and the flat surfaces 16 of the curved portion of the coil 4, this in order to ensure notably thermal coupling between the coil and the support. It is obvious in fact, that in these spaces, the elastomeric product in the case of longitudinal expansion of the coil will not undergo compression only a shearing which will not have the effect of transmission of exaggerated forces to the assembly.

It is self-evident that as regards this elastomeric product provided on the flat surfaces 16 of the curved portion of the coil, it is possible to provide the latter advantageously before its introduction inside the supports $5_A$ and $5_B$ and before, obviously, the fastening of the sheet 8 closing the gutter, which fastening is advantageously produced by means of a weld $8_A$ (see FIG. 2).

Due to these blocks of elastomeric product at 16 and to the fluid-tight seals 10 and 11 with which the coil 4 is also provided before its introduction inside the supports $5_A$ and $5_B$, said coil is held in desired position with respect to said supports during the whole injection operation of the composition giving rise to the binding elastomeric product 9, after its cross-linking at suitable temperature.

In addition, the portions of the coil 4 which must remain in the open air and cannot be protected by the supports, are covered with a protective layer $4_A$ (FIGS. 3A and 3B) of any suitable sort such as a resin of the epoxy type.

It has just been seen above how the invention enables the problem of longitudinal expansion of the coil to be resolved for considerable heating without exaggerated forces being transmitted to the assembly.

It will now be seen how, by means of another essential feature of the present invention, it is possible to resolve the particularly delicate problem of heat removal from the coil 4/elastomer 9 assembly in the end supports without there being loss of the possibility of transmitting longitudinal braking forces and without detachment of the elastomeric product from the support. The fact that the support is of steel results in its having a contraction distinctly less than that of the material constituting the coil, whence the problem of heat removal to be resolved.

It results in fact from this that if the blocks of elastomeric product 9 give, as has been seen previously, the simple and effective solution to the problem of heating due to the possibility that they have of being able to be elastically deformed without however transmitting to the assembly exaggerated forces, these same blocks of elastomeric product have the drawback of possessing a poor coefficient of adhesion. There would result therefrom therefore as such, the risk, on heat removal from the coil 4/elastomeric block 9 assembly, of seeing the elastomeric product become detached from the wall of the support with the consequences of no longer having a positive fastening of the coil in its end supports.

Figure 3B:
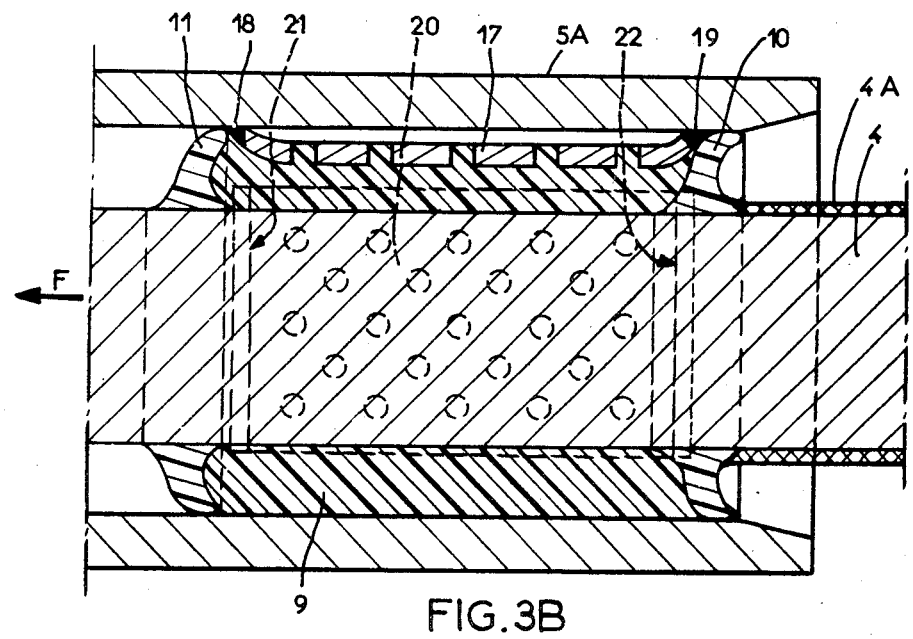
FIG. 3B is a detailed view in section similar to that of FIG. 3A, showing how the thermal shrinkages of the coil/elastomer assembly in the end supports are made possible, without the possibility of transmitting longitudinal braking forces and without troublesome detachment of the coil/elastomer assembly with respect to said support.

According to the invention, this risk is entirely eliminated and this, down to very low temperatures which can reach $-40°$ C. whilst permitting the restraint of the coil 4/elastomeric product 9 assembly without the mechanical contact between the elastomeric product and the support being broken, in the manner which will be described below with reference to FIGS. 2, 3A and 3B.

Prior to the introduction of the ends of the coil 4 into the supports $5_A$ and $5_B$, the upper inner wall of each of the supports $5_A$ is provided, for example, with a perforated flat steel sheet, denoted by the reference 17. This metal sheet, which has a thickness of the order of 1 mm, and includes holes distributed in quincunx of diameter of the order of 2.5 mm, is substantially rectangular, the width and length being determined so that it occupies practically the whole area comprised between the seals 10 and 11 of the coil 4. According to an important feature of the invention, the sheet metal 17 is welded to the support, only at its ends, or at least, at one of its ends, in the direction of length, by weld lines 18 and 19 (see FIGS. 3A and 3B).

In addition, a second rectangular metal sheet 20 provided with holes distributed in quincunx, is also welded only through its ends 21, 22 or at least at one of its ends, to the inner vertical wall of the support $5_A$ which is opposite the plate 8 closing the gutter.

It is immediately seen that, due to the elasticity of the fluid-tight seals 10 and 11 with which the coil 4 is provided, that it is easy to introduce said coil 4 inside the gutter to bring it, with respect to the metal sheets 17 and 20, into the final position shown in FIG. 3A.

After having then closed the chute $5_A$, for example, by welding the sheet 8 against the support, there followed the injection through the orifices 12 and 13 of the composition into the enclosure. After the pressure exerted on injection, the composition comes into contact with the inner walls of the enclosure thereby completely filling all of the holes formed in the metal sheets 17 and 20, vents (not shown) permitting air to be evacuated.

After cross-linking, at a suitable temperature, of the injectable composition, the latter gives rise to the elastomeric product 9 which then fills the enclosure completely up to and including the holes of the sheet metal 17 and 20.

When there is heating, the coil 4 may be moved in the direction of the arrow F by the deformation of the block of elastomeric product 9, as has been described previously, without the transmission of exaggerated forces to the assembly. In addition, the coil 4 being held perfectly in its end supports $5_A$ and $5_B$, the coil 4 will be able to support without risk the longitudinal forces to which it is subjected on dynamic eddy current braking, this being all the better as the elastomeric product is anchored in the holes with which the metal sheets 17 and 20 are provided.

If, on the contrary, the assembly is subjected as has been seen to very low temperatures which can reach, for example, $-40°$ C., the thermal shrinkage of the coil 4/elastomer 9 assembly will cause a slight deformation of the metal sheets 17 and 20 quite simply in their central portion, without however the mechanical contact between said elastomeric product 9 gripped in the holes formed in the metal sheets 17 and 20 in their central portion, being broken on the one hand, and the support $5_A$, on the other hand, to which the metal sheets are welded by their ends.

Due to this possibility of partial deformation of the metal sheets, the elastomeric product 9 remains perfectly glued to the two other surfaces of the enclosure of the gutter.

It is found therefore that, as in the case of considerable heating, the coil 4 is also perfectly maintained in its end supports, in the case of very low temperatures, and will be able also to support there without risk the longitudinal forces to which it is subjected on dynamic eddy current braking.

It is self-evident that the present invention has only been described and illustrated by way of preferred example and that equivalent techniques could be introduced therein without however departing from the scope of said invention, which is defined in the appended claims.

I claim:

1. An assembly system for assembling and fixing to the chassis or bogie of a railway vehicle, a winding for dynamic eddy current braking of the type comprising a coil constituting a rigid one-piece member, including two parallel rectilinear arms joined through two curvilinear ends, said coil being held around the lower half of a vehicle wheel by means of two steel supports fixed to the ends of the coil, said assembly system comprising in combination:

- each end support having the general shape of a yoke inverted in a horizontal plane and being spaced from said coil for leaving a certain amount of clearance between said coil and the curvilinear ends of said coil and a portion of said rectilinear arms, each said yoke shaped support enclosing each respective end of said coil about a horizontal lower surface, a vertical outer surface, and a horizontal upper surface;
- a thin sheet of non-magnetic material closing the open space defined by the respective yoke shaped support to thereby define a free enclosure around the corresponding end of said coil;
- holes formed in said supports to inject inside said free enclosure a composition capable of forming an elastomeric product after cross-linking at a suitable temperature;
- a pair of fluid-tight seals extending between said coil and said support adjacent each open end of each support to define in each of said free enclosures of said supports an injection zone between each said pair of seals for said composition, said zones being limited to a portion of said coil enclosed inside said supports; and at least one plate arranged inside each said injection zone and facing a horizontal inner wall of said support which is opposite one of said horizontal surfaces of the coil, said plate being immobilized in translation relative to said support in a direction parallel to the rectilinear arms of the coil but being separable from the inner wall of the support whereby after injection of the composition into the injection zones of the support and cross-linking, blocks of elastomer complete fill said injection zones, which permits both thermal expansion and contraction of the coil and elastomer in the support, without loss of the transmission of forces to the support occurring in the course of braking, without exaggerated transfer of forces to the support in the case of considerable heating or cooling and without detachment of the elastomer in the case of a very considerable drop in the ambient temperature.

2. An assembly system according to claim 1, in which each support comprises in addition to the plate arranged facing said horizontal inner wall, a second plate arranged facing a vertical inner wall of said support and facing said vertical outer side surface of said coil.

3. An assembly system according to claim 2, wherein the plates include engagement means for the elastomer.

4. An assembly system according to claim 3, in which the plates are formed of thin sheet metal fixed in each support only along at least one of their ends by welding.

5. An assembly system according to claim 4, in which the end supports are provided laterally on one of their ends with an ear enabling cantilevered fixing of the assembly to the bogie by simple braces.

6. An assembly system according to claim 5, wherein a portion of the curvilinear ends of said coil along the upper and lower surfaces thereof is provided with a layer of elastomer outside of said injection zones which, when the coil is in position in the support, is only subjected possibly to a shearing force, having no adverse effect of exaggerated force transmission on the assembly but has the advantage of perfecting the thermal coupling between the coil and the support.

7. An assembly system according to claim 6, in which the portions of said coil not enveloped by said end supports are covered with a protective layer.

8. An assembly system according to claim 7, wherein said protective layer is a resin of the epoxy type.

9. An assembly system according to claim 7, wherein said end supports are one-piece units.

* * * * *